United States Patent [19]

Maciula et al.

[11] 3,776,385

[45] Dec. 4, 1973

[54] HYDROCLONE FOR SIMULTANEOUSLY SEPARATING IMMISCIBLE HEAVIER LIQUIDS AND SOLIDS FROM A LIQUID MEDIUM

[75] Inventors: Andrew Maciula; William G. Tiederman, both of Stillwater; Robert E. Reed, Bethany, all of Okla.

[73] Assignee: Oklahoma State University, Stillwater, Okla.

[22] Filed: Dec. 13, 1971

[21] Appl. No.: 207,122

[52] U.S. Cl. ................... 210/304, 55/52, 209/211, 210/311, 210/512
[51] Int. Cl. ............................................. B04c 5/04
[58] Field of Search .................... 55/52, 203, 204; 209/211; 210/84, 304, 311, 512

[56] References Cited
UNITED STATES PATENTS
3,529,724  10/1970  Maciula et al. .................. 210/304 X
3,271,929  10/1966  Bowden et al. .................... 55/203 X
1,600,762  10/1926  Hawley ........................... 210/512 X

*Primary Examiner*—Samih N. Zaharna
*Assistant Examiner*—Robert H. Spitzer
*Attorney*—Head & Johnson

[57] ABSTRACT

A hydroclone for simultaneously separating immiscible heavier liquids from a lighter liquid medium and solids from the lighter liquid including a cylindrical portion having an inlet tangentially intersecting the interior wall and an upper axial outlet, a conical portion axially received within the cylindrical portion, the interior surface of the conical portion being tapered to a reduced diameter vortical opening, the outer diameter of the conical portion being less than the inner diameter of the cylindrical portion providing an annular heavier liquid passageway therebetween, and an underflow pot communicating with the opened bottom cylindrical portion and the vortical opening of the conical portion, the underflow pot receiving expelled heavier liquids and some of larger solid particles through the annular passageway and expelled solids through the vortical opening.

6 Claims, 5 Drawing Figures

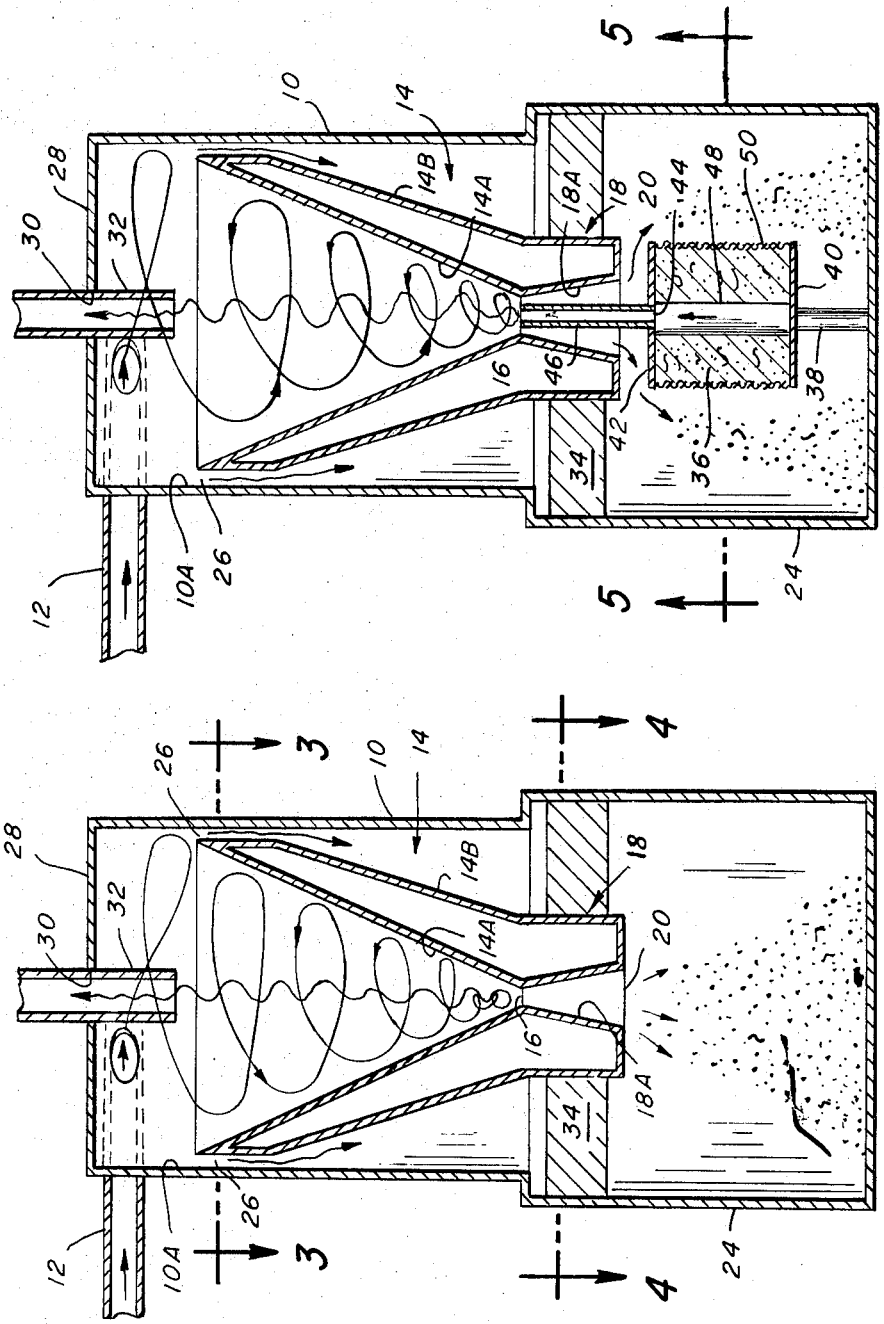

INVENTORS.
L. ANDREW MACIULA
ROBERT E. REED
WILLIAM G. TIEDERMAN, JR.
BY
*Head & Johnson*
ATTORNEYS

HYDROCLONE FOR SIMULTANEOUSLY SEPARATING IMMISCIBLE HEAVIER LIQUIDS AND SOLIDS FROM A LIQUID MEDIUM

BACKGROUND, SUMMARY AND OBJECTS OF THE INVENTION

The use of hydroclone devices for separating heavier solid components from a lighter liquid medium is well known. For a background on the construction and application of hydroclone devices for this purpose, reference may be had to the following U. S. Pat. Nos. 3,235,090; 3,501,014; and 3,529,724. In the operation of a hydroclone centrifugal forces are created which cause heavier-than-liquid solids to be cast out of the whirling stream and to be discharged into a collection chamber. In the typical hydroclone designed for solid contaminant separation the induced vortex moving up through the center of the cylindrical chamber creates high shear forces increasing to a maximum in the vicinity of the minimum conical diameter. If an immiscible heavier liquid is contained in the lighter liquid medium, the higher shear forces tend to create an emulsion, thereby hampering the separation of heavier liquids from a lighter liquid medium.

This invention is directed to overcoming the disadvantages with known types of hydroclone devices to achieve improved separation of heavier immiscible liquids from a lighter liquid medium.

A more particular object of this invention is to provide a hydroclone including means of simultaneously separating heavier immiscible liquid components from a lighter liquid medium and solid components from the lighter liquid medium by utilizing centrifugal forces simultaneously in different manners for each function.

Another object of this invention is to provide a hydroclone apparatus including means in one portion thereof for ejecting heavier immiscible liquid components from a lighter liquid medium, directing the ejected heavier liquid components downwardly through an annular passageway, ejecting solid particles from the lighter liquid medium in a conical portion, and passing the ejected solid particles downwardly through a vortical opening in the conical portion.

These and other objects will be fulfilled in the following description and claims, taken in conjunction with the attached drawings.

DESCRIPTION OF VIEWS

FIG. 1 is a cross-sectional view of a hydroclone device embodying the principles of this invention for the simultaneous separation of heavier immiscible liquid components from a lighter liquid medium, and solid components from the lighter medium.

FIG. 2 is a cross-sectional view of the hydroclone device of FIG. 1 including means for filtering liquid flowing from the underflow pot back to the interior of the hydroclone conical portion.

DETAILED DESCRIPTION

Figure 5:
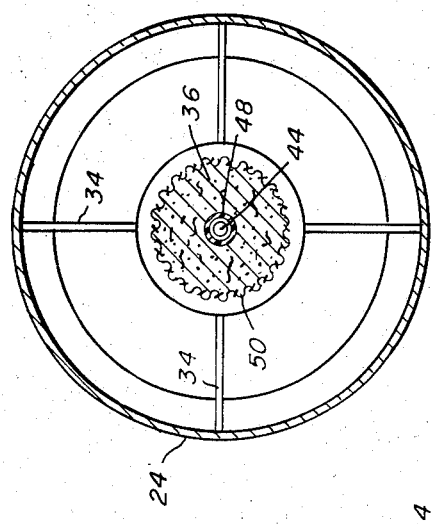
FIG. 5 is a cross-sectional view taken along the line 5—5 of FIG. 2 showing the filter positioned within the underflow pot.
Figure 4:
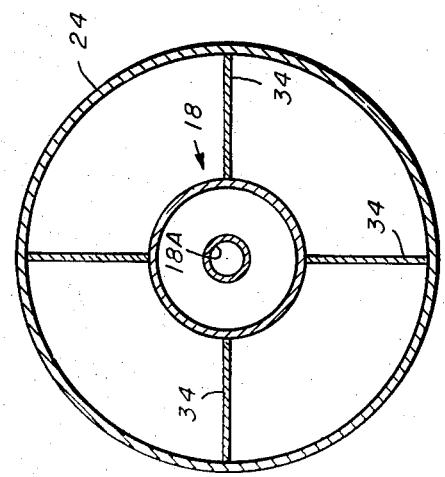
FIG. 4 is a cross-sectional view taken along the line 4—4 of FIG. 1 and showing radial fins utilized for the purpose of supporting the conical portion within the cylindrical portion of the hydroclone.
Figure 3:
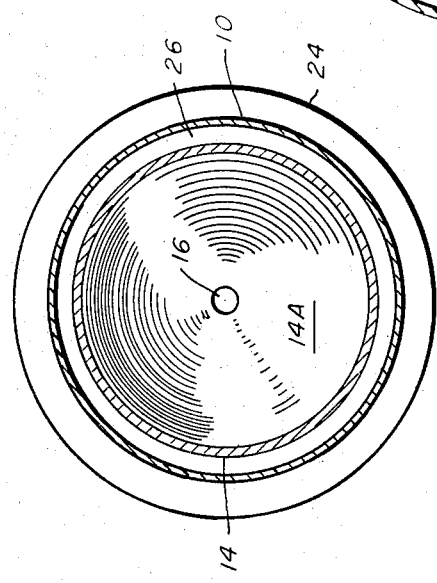
FIG. 3 is a cross-sectional view taken along the line 3—3 of FIG. 1 and showing the annular passageway wherein ejected heavier liquid components flow downwardly to the underflow pot.

Referring to the drawings and first to FIG. 1, a simplified embodiment of a hydroclone including the principles of this invention is shown. The hydroclone includes an upright cylindrical portion 10. Tangentially intersecting the interior wall 10A of the cylindrical portion is an inlet 12 by which liquid, under presure, is injected into the hydroclone. This invention is particularly concerned with means for separating both heavier immiscible liquid contaminants and solid contaminants from the liquid medium. As a good example, but not intended as a limitation to the application of the invention, a common requirement is the elimination of water and solid particles, such as rust, dirt or the like, from fuel, such as gasoline or kerosene. It is particularly important that these contaminants be eliminated from aviation fuel. Thus, as an example, aviation fuel including immiscible liquid contaminants, such as water, and solid contaminants, such as rust and dirt, may be injected into inlet 12. The liquid enters the cylinder portion 10 and takes a circuitous path. The heavier immiscible liquid component (water) is forced to the exterior of the circular flow path and travels around the interior wall of the cylindrical portion 10.

Positioned coaxially within the cylindrical portion 10 is a conical portion generally indicated by the numeral 14. In the illustrated arrangement the conical portion 14 includes a conical interior surface 14A and an exterior surface 14B, the surfaces being spaced from each other. It can be seen that in a simplified embodiment the surfaces 14A and 14B may be separated from each other only by the thickness of material forming the conical portion 14. The exemplified construction of conical portion 14 is desired to obtain the optimum configuration of the interior surface 14A and the exterior surface 14B without the requirement such surfaces being machined from thick material, although such arrangement would be completely satisfactory.

The interior conical surface 14A tapers downwardly in reduced diameter to a vortical opening 16. In the illustrated arrangement a subconical portion, generally indicated by the numeral 18 is employed, including a subconical surface 18A coaxial with the conical surface 14A. The subconical surface 18A tapers outwardly from vortical opening to an enlarged opening 20.

Received on the lower end of the cylindrical portion 10 is an underflow pot 24. In the illustration the underflow pot 24 is shown to be of slightly larger exterior and interior diameter than cylindrical portion 10 to graphically illustrate the separate functions of the two portions although it can be seen that the underflow pot 24 may be in the form of a lower extension of a cylindrical portion 10.

The exterior diameter of conical portion 14 is smaller than the interior diameter of the cylindrical portion 10 providing an annular heavier liquid passageway 26 therebetween. Thus, the upper end of cylindrical portion 10 communicates with underflow pot 24 through annular passageway 26 while the lower end of the conical portion 14 communicates with the underflow pot through vortical opening 16.

Cylindrical portion 10 is closed at the upper end by a top 28 which includes an axial outlet opening 30. In the illustrated arrangement the opening 30 receives an outlet conduit 32 which extends axially downwardly within the cylindrical portion 10, the downwardly extending outlet conduit providing a vortex finder.

Positioned within the upper end of underflow pot 24 are a plurality of radially extending vertical fins 34. The function of fins 34 is to support the conical portion 14 within the cylindrical portion 10.

FIG. 2 shows an alternate embodiment of the invention. A filter 36 is positioned within underflow pot 24. The filter is supported by a post 38 having a plate 40 on the upper end thereof. An upper plate 42 seals the upper end of the filter 36. The upper plate 42 has an opening 44 therein which communicates with the lower end of a return flow conduit 46. Filter 36 includes a central opening 48 communicating with the opening 44 in upper plate 42 and with return conduit 46.

The illustrated filter 36 includes an external circumference 50 which is foraminous and receives the flow of fluid therethrough. In the simplest embodiment filter 36 may be said to have an inlet opening 50 and an outlet opening 44 with the inlet opening 50 communicating with the interior of underflow pot 24 and the outlet opening 44 communicating with the interior of cylindrical portion 14. Filter 36 is preferably a combination coalescer and filter which serves not only to trap solid particles, but to retard the flow of liquid which is immiscible in the liquid medium, that is, such as to retard the flow of water therethrough when the liquid medium is a hydrocarbon, such as gasoline or kerosene.

OPERATION

A liquid medium contaminated with a heavier immiscible liquid and heavier solid particles is injected under pressure into the hydroclone through inlet 12. The tangential intersection with the interior wall 10A of cylinder portion 10 causes the liquid to whirl in a rapid circular path. The centrifugal force of the whirling liquid casts the heavier, immiscible liquid towards the cylindrical wall. The annular area 26 provides a path through which the heavier liquid cast outwardly by the whirling flow passes downwardly into underflow pot 24. Thus, the extracted heavier liquid enters the underflow pot without having to pass through the conical portion 14. It has been learned that heavy liquid required to pass downwardly through underflow pot 14 and vortical opening 16 is subjected to high shear forces which tend to emulsify the immiscible heavier liquid contaminant with the lighter liquid medium. By the arrangement of this invention wherein such heavier liquids are ejected without subjecting them to the high shear forces experienced at the vortical opening 16 opportunity is presented for separation of the heavier liquid components with minimum emulsification.

The whirling liquid in the upper end of cylindrical portion 10 ejects, by centrifugal force, suspended solid particles. Such solid particles pass downwardly through annular passageway 26 with the ejected heavier liquid components, however, if drag forces exceed the centrifugal forces, the solid particles will circulate within the conical portion 14 and be separated in the normal manner at vortical opening 16 to enter the underflow pot 24.

In the arrangement of FIG. 2 provision is made for the return of liquid out of underflow pot 24 back to the upper portion of hydroclone in a manner wherein the return fluid is free of contaminant. Liquid from the underflow pot enters filter 36 through porous surface 50. The solid particles are captured by the barrier type filter 36 while heavier immiscible liquid components are retarded from flowing through the filter by its coalescing action. Thus liquid free of solid particles and heavier liquid components enters the central opening 48 and flows upwardly through the discharge conduit 46 into the cylindrical portion 14 and ultimately out of the hydroclone with other contaminant-free liquid which has migrated against centrifugal force to the interior of the conical portion.

The arrangement of FIG. 2 provides for recirculation of fluid from within the underflow pot 24 back to the hydroclone. Other means for compensating for the flow into the underflow pot 24 to prevent reverse fluid flow through vortical opening 16 may be seen from copending application entitled "HYDROCLONE APPARATUS FOR SEPARATING HEAVY COMPONENTS FROM A FLUID MEDIUM" filed concurrently herewith.

While the invention has been described with a certain degree of particularity it is manifest that many changes may be made in the details of construction and the arrangement of components without departing from the spirit and scope of this disclosure. The invention is not limited to the embodiments set forth herein for purposes of exemplification, but is to be limited only by the scope of the attached claim or claims, including the full range of equivalency to which each element or step thereof is entitled.

We claim:

1. An improved hydroclone for simultaneously separating heavier immiscible liquids from a lighter liquid medium and solids from the lighter liquid medium comprising:
    a cylindrical portion having a closed top and an opened bottom, having a fluid inlet tangentially intersecting the interior wall, and having a fluid outlet axially received in the closed top;
    a conical portion coaxially received in said cylindrical portion, the interior surface thereof tapering to a reduced diameter axial vortical opening at the lower end thereof, the outer diameter of the conical portion being less than the inner diameter of said cylindrical portion providing an annular heavier liquid passageway therebetween; and
    an underflow pot communicating with said open bottom of said cylindrical portion and said vortical opening of said conical portion, said underflow pot receiving expelled heavier liquid through said annular passageway and expelled solids through said vortical opening.

2. An improved hydroclone for simultaneously separating heavier immiscible liquids from a lighter liquid medium and solids from the lighter liquid medium according to claim 1 including:
    a filter having a fluid inlet opening and a fluid outlet opening, the fluid inlet opening communicating with said underflow pot and the fluid outlet opening communicating with the interior of said conical portion.

3. An improved hydroclone for simultaneously separating heavier immiscible liquids from a lighter liquid medium and solids from the lighter liquid medium according to claim 2 wherein said filter includes a fluid outlet conduit axially positioned in said conical portion vortical opening.

4. An improved hydroclone for simultaneously separating heavier immiscible liquids from a lighter liquid medium and solids from the lighter liquid medium according to claim 2 wherein said filter is axially positioned in said underflow pot, said filter having a central fluid receiving chamber and an axially positioned outlet conduit communicating at one end to said fluid chamber at the other end with said conical member vortical opening, said filter receiving the flow of fluid therein around the filter exterior circumference.

5. An improved hydroclone for simultaneously separating heavier immiscible liquids from a lighter liquid medium and solids from the lighter liquid medium according to claim 1 including:

an axial subcone portion affixed to said conical portion lower end, said subcone portion having an axial opening communicating with said conical portion vortical opening and tapering to an enlarged diameter axial outlet opening communicating with said underflow pot.

6. An improved hydroclone for simultaneously separating immiscible heavier liquids for a lighter liquid medium and solids from the lighter liquid medium according to claim 1 including:

spaced apart, radially extending fins between said underflow pot and said conical portion, said fins serving to support said conical portion.

* * * * *